US012575470B2

(12) United States Patent
Klopfenstein et al.

(10) Patent No.: US 12,575,470 B2
(45) Date of Patent: Mar. 17, 2026

(54) SYSTEM FOR ELIMINATING DELAYED HITCH RESPONSE DUE TO AIR INGRESS WITHIN AGRICULTURAL MACHINERY

(71) Applicant: CNH Industrial America LLC, New Holland, PA (US)

(72) Inventors: Matthew Roy Klopfenstein, Chenoa, IL (US); Jerry Lee Brinkley, Woodridge, IL (US); Joshua Guarino, Plainfield, IL (US)

(73) Assignee: CNH Industrial America LLC, Holland, PA (US)

( * ) Notice: Subject to any disclaimer, the term of this patent is extended or adjusted under 35 U.S.C. 154(b) by 768 days.

(21) Appl. No.: 17/967,260

(22) Filed: Oct. 17, 2022

(65) Prior Publication Data

US 2024/0122089 A1 Apr. 18, 2024

(51) Int. Cl.
*A01B 59/06* (2006.01)
*A01B 63/10* (2006.01)

(52) U.S. Cl.
CPC ........ *A01B 59/068* (2013.01); *A01B 63/1006* (2013.01)

(58) Field of Classification Search
CPC ..... A01B 59/066; A01B 59/068; A01B 63/10; A01B 63/1006
See application file for complete search history.

(56) References Cited

U.S. PATENT DOCUMENTS

| | | | | |
|---|---|---|---|---|
| 4,687,407 A | * | 8/1987 | Osborne | ................. E02F 3/627 |
| | | | | 172/473 |
| 5,423,394 A | * | 6/1995 | Kendle | ................ A01B 59/048 |
| | | | | 180/53.3 |
| 7,219,636 B2 | | 5/2007 | Sawada | |
| 7,942,245 B2 | | 5/2011 | Shimizu et al. | |
| 7,946,389 B2 | | 5/2011 | Kakinami et al. | |
| 8,505,645 B1 | | 8/2013 | Kelly et al. | |

(Continued)

FOREIGN PATENT DOCUMENTS

| | | |
|---|---|---|
| CN | 105422525 | 3/2016 |
| JP | H0658106 B2 | 8/1994 |

(Continued)

OTHER PUBLICATIONS

Eaton, Vickers General Product Support, "Hydraulic Hints Trouble Shooting Guide", 1996, 29 pgs.

*Primary Examiner* — Tara Mayo
(74) *Attorney, Agent, or Firm* — Fletcher Yoder, P.C.

(57) ABSTRACT

A hydraulic system for a three-point hitch includes at least one hitch cylinder and a first flow path. The hydraulic system includes a hitch valve fluidly coupled to the at least one hitch cylinder via the first flow path, wherein the hitch valve is configured to control a flow of hydraulic fluid to the at least one hitch cylinder. The hydraulic system includes a second flow path fluidly coupled to the first flow path at a first location between the at least one hitch cylinder and the hitch valve, wherein the second flow path is fluidly coupled to a reservoir for the hydraulic fluid. The hydraulic system includes a first check valve disposed along the second flow path between the first flow path and the reservoir, wherein the first check valve is configured to keep air from entering the hydraulic system via the second flow path from the reservoir.

18 Claims, 3 Drawing Sheets

(56) References Cited

U.S. PATENT DOCUMENTS

| | | | |
|---|---|---|---|
| 9,200,644 | B2 | 12/2015 | Barfels et al. |
| 9,657,614 | B2 | 5/2017 | Long et al. |
| 10,927,936 | B2 | 2/2021 | Buschur |
| 2004/0140109 | A1* | 7/2004 | Schlesser et al. ... A01B 59/066<br>172/439 |
| 2010/0206270 | A1 | 8/2010 | Rabhi |

FOREIGN PATENT DOCUMENTS

| | | |
|---|---|---|
| JP | 2006038065 | 2/2006 |
| JP | 2008230332 | 10/2008 |
| JP | 2011247369 | 12/2011 |

* cited by examiner

SYSTEM FOR ELIMINATING DELAYED HITCH RESPONSE DUE TO AIR INGRESS WITHIN AGRICULTURAL MACHINERY

BACKGROUND OF THE INVENTION

The present disclosure relates generally to a system for eliminating delayed hitch response due to air ingress within agricultural machinery.

Certain work vehicles, such as tractors, include a three-point hitch configured to engage a corresponding hitch of a towed implement. Certain three-point hitches include two lower lift arms and an upper link. Each lower lift arm includes an opening configured to receive a corresponding lower hitch pin of the towed implement hitch, and the upper link includes an opening configured to receive a corresponding upper hitch pin of the towed implement hitch. Each hitch pin may be disposed within a corresponding opening to couple the towed implement to the work vehicle.

During the operation of the three-point hitch on a tractor there are certain work scenarios that cause air to be pulled into the system. More specifically, air is pulled into the hitch cylinder due to the configuration of the circuit. Air can be pulled to into the system under two scenarios. In the first scenario, when the hitch is in a neutral position, the load on the hitch in combination with vehicle travel causes the hitch to go up. If the upward motion of the hitch has enough force it can pull a suction, thus, opening a check valve and pulling air from the tank (e.g., reservoir). The suction pulls in air instead of fluid (e.g., oil) because the return of the hitch valve is above oil level in the tank. In the second scenario, the hitch is in a float position. In a float position the hitch can freely (with some force required) move up and down. When the hitch moves down in the float position, fluid (e.g. oil) is forced from the cylinder to the tank with no issues. However, if the hitch is forced up, it will pull a section once again and pull in air from the tank similar to the first scenario. When air is pulled into the system, it creates a delay in hitch performance once resuming normal raising/lowering operations after being in float. The air in the hitch cylinder has to be compressed in order the raise the hitch (unlike oil). The time it takes to compress the air is what creates the delay. This is a particular problem in hitch systems that utilize single acting hydraulic cylinders where the acting side drains to the tank above oil level.

SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a hydraulic system for a three-point hitch is provided. The hydraulic system includes at least one hitch cylinder and a first flow path. The hydraulic system also includes a hitch valve fluidly coupled to the at least one hitch cylinder via the first flow path, wherein the hitch valve is configured to control a flow of hydraulic fluid to the at least one hitch cylinder along the first flow path. The hydraulic system further includes a second flow path fluidly coupled to the first flow path at a first location between the at least one hitch cylinder and the hitch valve, wherein the second flow path is fluidly coupled to a reservoir for the hydraulic fluid. The hydraulic system still further includes a first check valve disposed along the second flow path between the first flow path and the reservoir, wherein the first check valve is configured to keep air from entering the hydraulic system via the second flow path from the reservoir.

In certain embodiments, a three-point hitch is provided. The three-point hitch includes a first hitch cylinder and a second hitch cylinder. The three-point hitch also includes a hydraulic system coupled to both the first hitch cylinder and the second hitch cylinder and configured to provide hydraulic fluid to both the first hitch cylinder and the second hitch cylinder, wherein hydraulic system is configured to keep air from entering the hydraulic system from a reservoir of the hydraulic fluid when the three-point hitch is in a neutral position and when the three-point hitch is in a float position.

In certain embodiments, a method for operating a hydraulic system of a three-point hitch is provided. The method includes controlling a flow of hydraulic fluid to both a first hitch cylinder and a third hitch cylinder of the three-point hitch via a hitch valve fluidly coupled to both the first hitch cylinder and the second hitch cylinder via a first flow path. The method also includes keeping air from entering the hydraulic system from a reservoir of the hydraulic fluid when the three-point hitch is in a neutral position and when the three-point hitch is in a float position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
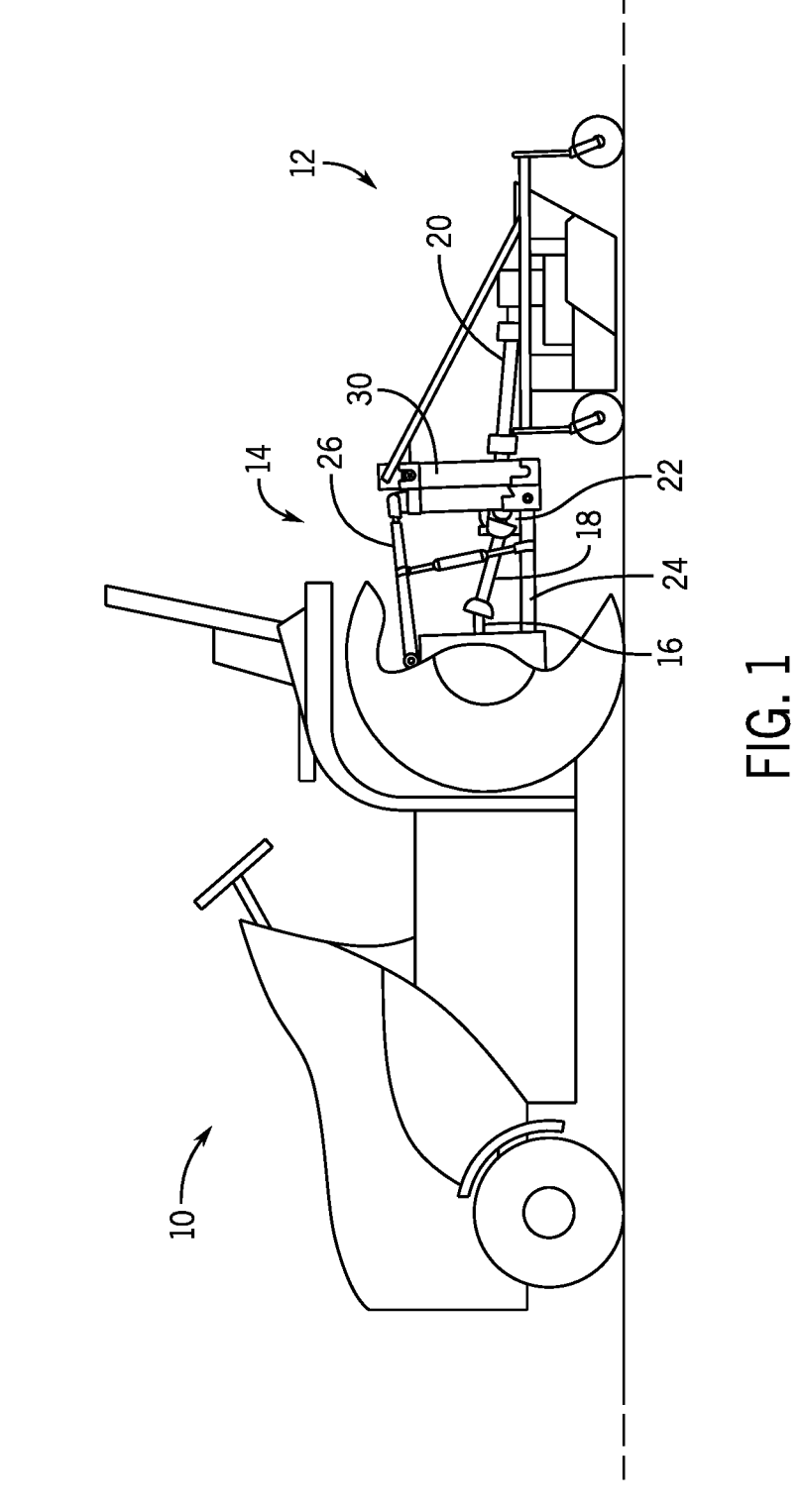
FIG. 1 is a side view of a work vehicle coupled to an implement via a three-point hitch, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to a hydraulic system for a three-point hitch. In particular, the hydraulic system is configured to keep air from entering the hydraulic system from a reservoir of hydraulic fluid when the three-point hitch is in a neutral position (i.e., the hitch is neither raised or lowered) and when the three-point hitch is in a float position (i.e., a position that enables the hitch to raise and lower with minimal resistance to an enable an agricultural implement to follow a contour of the ground). The hydraulic system includes one or more hitch cylinders. A hitch valve is fluidly coupled to the one or more hitch cylinders via a first flow path to control a flow of hydraulic fluid (e.g., oil) to the at least one hitch cylinder along the first flow path. A second flow path is fluidly coupled to the first flow path at a location between the one or more hitch cylinders and the hitch valve. The second flow path is coupled to the reservoir for the hydraulic fluid. A first check valve is disposed along the second flow path between the first flow path and the reservoir. The first check valve is configured to keep air from entering the hydraulic system via the second flow path from the reservoir (e.g., when the hitch is in the neutral and/or the float position). The first check valve is located above a hydraulic fluid level within the reservoir. The first check valve may be spring loaded with a bias of approximately 1 to 3 pounds per square inch (psi) (e.g., 6.89 to 20.68 kilopascals (kPa)) to ensure no air can be pulled into the one or more hitch cylinders through the first check valve.

A third flow path is fluidly coupled to both a first hitch cylinder (e.g. on the piston side) and the reservoir, while a fourth flow path is fluidly coupled to both a second hitch cylinder (e.g., on the piston side) and the reservoir. A second check valve is disposed along the third flow path between the first hitch cylinder and the reservoir. A third check valve is disposed along the fourth flow path between the second hitch cylinder and the reservoir. Both the second check valve and the third check valve are configured to enable only hydraulic fluid from entering the hydraulic system (and the first hitch cylinder and the second hitch cylinder, respectively) via the third flow path and the fourth flow path, respectively, when a suction force is created. The second check valve and the third check valve are located below the first hitch cylinder and the second hitch cylinder, respectively. In particular, the second check valve and the third check valve are disposed below a hydraulic fluid level within the reservoir. The second check valve and the third check valve may both be spring loaded with a bias of approximately 1 to 3 psi (e.g., 6.89 to 20.68 kPa). The configuration of the hydraulic system enables piston side hydraulic fluid to drain below the hydraulic level in the reservoir. The arrangement of the first, second, and third check valves enables the hydraulic system to maintain normal operation of the three-point hitch, while protecting against air ingress (e.g. when the hitch is in the neutral position and in the float position).

FIG. 1 is a side view of an embodiment of a work vehicle 10 coupled to an implement 12 via a three-point hitch 14. The work vehicle 10 is configured to tow the implement 12 (e.g., through a field) along a direction of travel 15. In the illustrated embodiment, the work vehicle 10 is a tractor. However, in other embodiments, the work vehicle may be any other suitable type of work vehicle configured to tow an implement, such as a harvester or a sprayer. Furthermore, in the illustrated embodiment, the implement 12 is a powered implement, such as a spreader, a rotary mower, or a rotary tiller. The implement is powered by a power-take off (PTO)

shaft 16 of the work vehicle 10. An engine of the work vehicle 10 drives the PTO shaft to rotate (e.g., via a transmission, a PTO drive system, etc.), and rotation of the PTO shaft drives rotation of one or more rotary components of the implement 12, such as a rotary spreader system, mower blades, or a rotary tillage assembly. In the illustrated embodiment, the PTO shaft 16 includes a telescoping portion 18 configured to facilitate adjustment of a length of the PTO shaft 16 to accommodate different types of powered implements. However, in other embodiments, the work vehicle may have a non-telescoping PTO shaft. As illustrated, the PTO shaft 16 of the work vehicle 10 is coupled to a corresponding shaft 20 of the implement 12, and the corresponding shaft 20 of the implement 12 is configured to drive rotation of the rotary component(s) of the implement 12. The PTO shaft 16 and the corresponding shaft 20 of the implement 12 are coupled to one another via a connection assembly 22. The connection assembly 22 may include any suitable device(s) configured to couple the PTO shaft 16 to the corresponding shaft 20, such that rotation of the PTO shaft 16 drives the corresponding shaft 20 to rotate. While the implement 12 is a powered implement in the illustrated embodiment, in other embodiments, the implement may be a non-powered implement, such as a vertical tillage implement, a primary tillage implement, a seeding implement, or a finishing implement. In such embodiments, the PTO shaft of the work vehicle may not be coupled to a corresponding shaft of the implement, or the work vehicle may not include a PTO shaft.

In the illustrated embodiment, the implement 12 is coupled to the work vehicle 10 via the three-point hitch 14 of the work vehicle 10. The three-point hitch 14 includes two lower lift arms 24 and an upper link 26. The two lower lift arms 24 and the upper link 26 are coupled (e.g., rotatably coupled) to a chassis of the work vehicle 10. In certain embodiments, one or more actuators (e.g., hitch cylinders) are coupled to the lower lift arms and configured to drive the lower lift arms to rotate relative to the chassis of the work vehicle. Each lower lift arm 24 includes an opening configured to receive a corresponding lower hitch pin of the implement 12, and the upper link 26 includes an opening configured to receive a corresponding upper hitch pin of the implement 12. In certain embodiments, each hitch pin of the implement 12 may be disposed within a corresponding opening to couple the implement 12 to the work vehicle 10.

Figure 2:
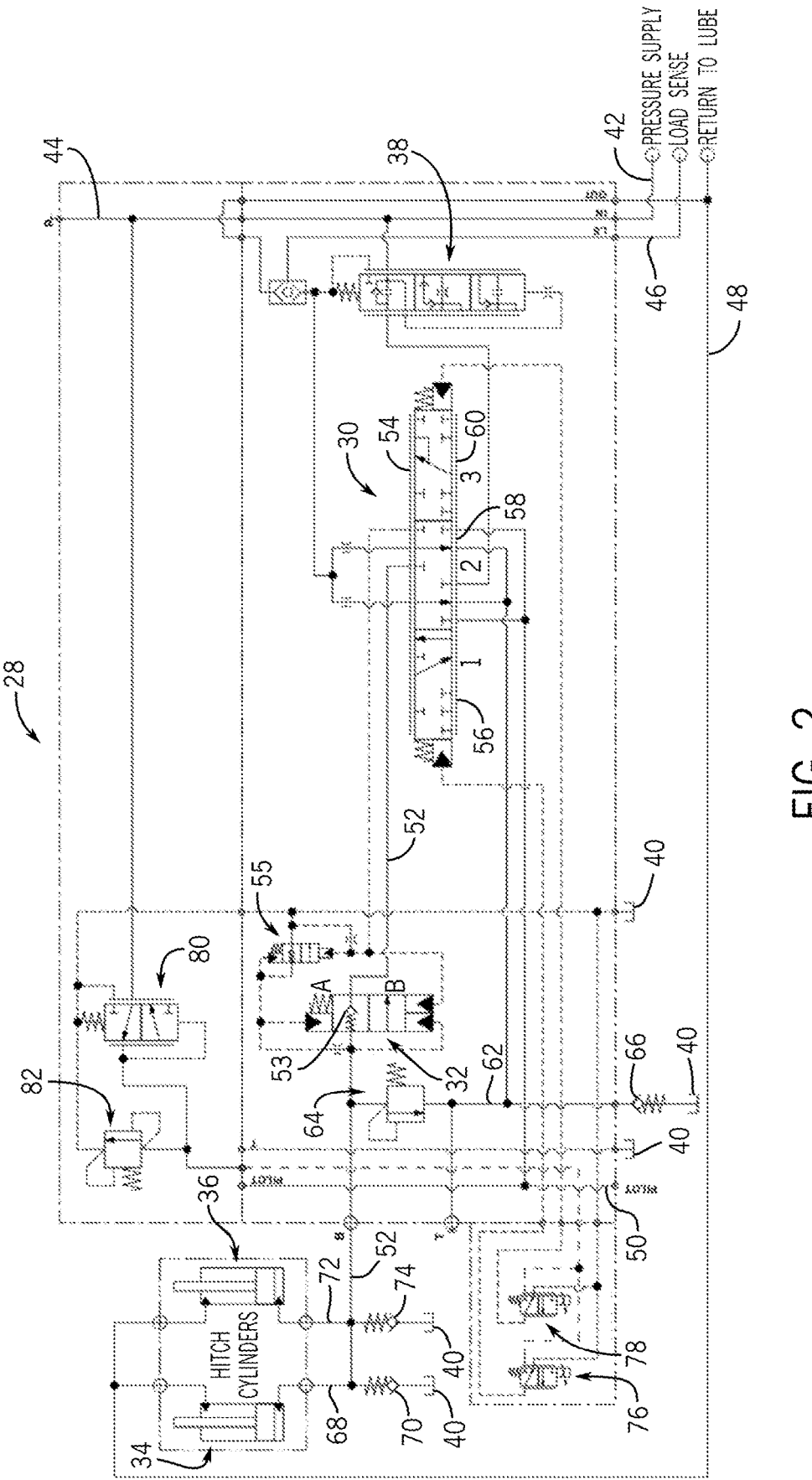
FIG. 2 is a schematic view of a hydraulic system for the three-point hitch in FIG. 1, in accordance with aspects of the present disclosure.

FIG. 2 is a schematic view of a hydraulic system 28 for the three-point hitch 14 in FIG. 1. The hydraulic system 28 includes a hitch valve 30, a bi-directional valve 32 (e.g. lowering valve), a pair of hitch cylinders 34, 36, and a pressure compensating control valve 38. The hitch valve 30, the bi-directional valve 32, the hitch cylinders 34, 36, and the pressure compensating valve 38 are fluidly coupled to a reservoir 40 (e.g., tank) for hydraulic fluid (e.g., oil).

A pump located on the work vehicle (e.g., work vehicle 10 in FIG. 1) is fluidly coupled to the reservoir 40 and is configured to provide the hydraulic fluid to the hydraulic system 28 via a main fluid supply conduit 42 (e.g., pressure supply conduit), a pilot fluid supply conduit 44, and a load sensing supply conduit 46. The main supply conduit 42 provides pressurized hydraulic fluid to the hydraulic system 28. The components of the hydraulic system 28 are also fluidly coupled to the reservoir 40 by a main fluid return conduit 48 and a pilot fluid return conduit 50.

The pressure compensating control valve 38 is fluid coupled between the main fluid supply conduit 42 and the hitch valve 30. The pressure compensating control valve 38 is also fluidly coupled to the load sensing supply conduit 46.

The pressure compensating control valve 38 is actuated by pressurized fluid through the load sensing supplying conduit 46. The pressure compensating control valve 38 isolates excess pressure within the main fluid supply conduit 42 and compensates for any excess pressure.

The hitch valve 30 is fluid coupled between the pressure compensating valve 38 and the hitch cylinders 34, 36. The hitch valve 30 is fluidly coupled to the hitch cylinders 34, 36 via a flow path 52. The hitch valve 30 controls a flow of the hydraulic fluid to the hitch cylinders 34, 36. The hitch valve 30 includes a hitch control spool 54. The hitch control spool 54 is movable between various states or positions for directing pressurized hydraulic fluid. The hitch control spool 54 includes a lower position/float position 56 (designated 1), a neutral position 58 (designated 2), and a raised position 60 (designated 3).

The bi-directional valve 32 is disposed along the flow path 52 between the hitch cylinders 34, 36 and the hitch valve 30 (which the bi-directional valve 32 is fluidly coupled to). The bi-directional valve 32 includes solenoids A and B. When solenoid A is activated (while solenoid B is deactivated), hydraulic fluid flow may only flow through the bi-directional valve 32 towards the hydraulic cylinders 34, 36 due to a check valve 53 in the bi-directional valve 32. When solenoid B is activated (while solenoid A is deactivated), free flow is enabled to allow hydraulic fluid to flow back and forth through the bi-directional valve 32 along the flow path 52. The bi-directional valve 32 is controlled via a pilot control valve 55 through the load sensing supplying conduit 46.

The hitch valve 30, in conjunction with the bi-directional valve 32, control a position of the three-point hitch 14. For example, when the hitch control spool 54 is in the lower position/float position 56 and solenoid A of the bi-directional valve 32 is activated, the three-point hitch 14 is in a lower position/float position. When the hitch control spool 54 is in the neutral position 58 and solenoid A of the bi-directional valve 32 is activated, the three-point hitch 14 is in a neutral position. When the hitch control spool 54 is in the raised position 60 and solenoid B of the bi-directional valve 32 is activated, the three-point hitch 14 is in a raised position.

A flow path 62 is fluidly coupled to the first flow path 52 at a location between the hitch cylinders 34, 36 and the hitch valve 30. The flow path 62 is coupled to the reservoir 40 for the hydraulic fluid. A pressure relief valve 64 is disposed along the flow path 62 to provide cushion relief. A check valve 66 is disposed along the flow path 62 between the flow path 52 (and the pressure relief valve 64) and the reservoir 40. The check valve 66 is configured to keep air from entering the hydraulic system 28 via the flow path 62 from the reservoir 40 (e.g., when the three-point hitch 14 is in the neutral and/or the float position and a suction force may be generated). The check valve 66 is located above a hydraulic fluid level within the reservoir 40. The check valve 66 is spring loaded with a bias of approximately 1 to 3 psi (e.g., 6.89 to 20.68 kPa) to ensure no air can be pulled into the one or more hitch cylinders 34, 36 through the check valve 66 (via the flow path 62).

A flow path 68 is fluidly coupled to both the hitch cylinder 34 (e.g. on the piston side via a line and tee fitting) and the reservoir 40. The flow path 68 is fluidly coupled to the flow path 52 downstream of the bi-directional valve 32. A check valve 70 is disposed along the flow path 68 between the hitch cylinder 34 and the reservoir 40. The check valve 70 is configured to enable only hydraulic fluid from entering the hydraulic system 28 (and the hitch cylinder 34) via the flow path 68 (e.g., when the three-point hitch 14 is in the neutral and/or the float position and a suction force may be generated). The check valve 70 is located below the hitch cylinder 34. In particular, the check valve 70 is disposed below a hydraulic fluid level within the reservoir 40. The check valve 70 is spring loaded with a bias of approximately 1 to 3 psi (e.g., 6.89 to 20.68 kPa). The check valve 70 on the flow path 68 enables piston side hydraulic fluid to return to below the hydraulic level in the reservoir 40.

A flow path 72 is fluidly coupled to both the hitch cylinder 36 (e.g. on the piston side via a line and tee fitting) and the reservoir 40. The flow path 72 is fluidly coupled to the flow path 52 downstream of the bi-directional valve 32 and upstream of the flow path 68. A check valve 74 is disposed along the flow path 72 between the hitch cylinder 34 and the reservoir 40. The check valve 74 is configured to enable only hydraulic fluid from entering the hydraulic system 28 (and the hitch cylinder 36) via the flow path 72 (e.g., when the three-point hitch 14 is in the neutral and/or the float position and a suction force may be generated). The check valve 74 is located below the hitch cylinder 36. In particular, the check valve 74 is disposed below a hydraulic fluid level within the reservoir 40. The check valve 74 is spring loaded with a bias of approximately 1 to 3 psi (e.g., 6.89 to 20.68 kPa). The check valve 74 on the flow path 72 enables piston side hydraulic fluid to return to below the hydraulic level in the reservoir 40.

The hydraulic system 28 may include other components. For example, as depicted, the hydraulic system 28 may include components for the pilot circuit such as control valves 76, 78, a reducing valve 80, and a relief valve 82.

Figure 3:
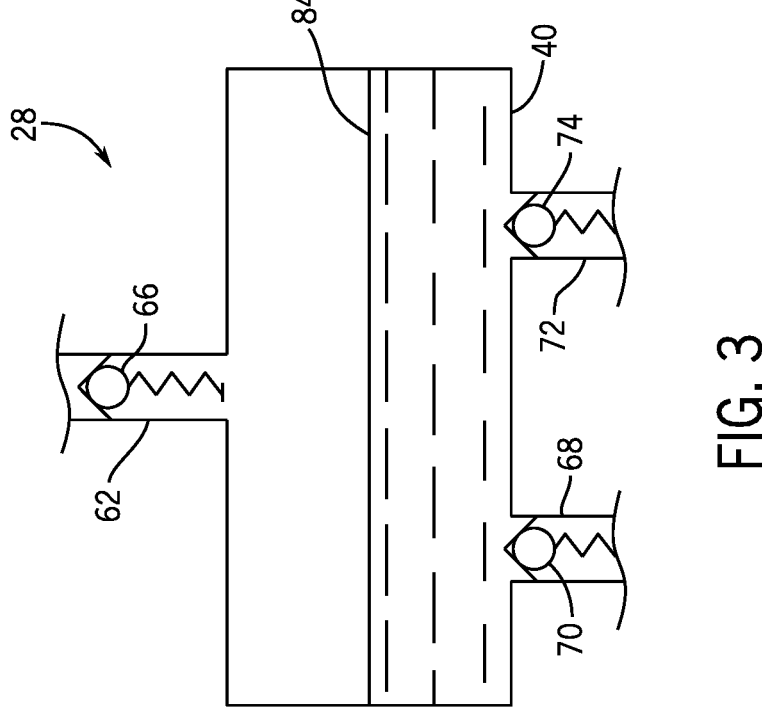
FIG. 3 is a schematic view of flow paths having check valves coupled to a reservoir of the hydraulic system in FIG. 2, in accordance with aspects of the present disclosure.

FIG. 3 is a schematic view of flow paths 62, 68, 72 having check valves 66, 70, 74 coupled to the reservoir 40 of the hydraulic system 28 in FIG. 2. The reservoir 40 as depicted in FIG. 3 includes a hydraulic fluid level 84 of the hydraulic fluid within the reservoir 40. Air resides in the reservoir 40 above the hydraulic fluid level 84. The spring loaded check valve 66 (and associated flow path 62) is located above the hydraulic fluid level 84. The check valve 66 is configured to keep air from entering the hydraulic system 28 via the flow path 62 from the reservoir 40 (e.g., when the three-point hitch is in the neutral and/or the float position and a suction force may be generated). The spring loaded check valves 70, 74 (and associated flow paths 68, 72) are both located below the hydraulic fluid level 84 to enable only hydraulic fluid from entering the hydraulic system 28 (and the hitch cylinders 34, 36 in FIG. 2) via the flow paths 68, 72 (e.g., when the three-point hitch is in the neutral and/or the float position and a suction force may be generated). The arrangement of the check valves 66, 70, 74 enables the hydraulic system 28 to maintain normal operation of the three-point hitch, while protecting against air ingress (e.g. when the hitch is in the neutral position and in the float position).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. A hydraulic system for a three-point hitch, comprising:
at least one hitch cylinder;
a first flow path;
a hitch valve fluidly coupled to the at least one hitch cylinder via the first flow path, wherein the hitch valve is configured to control a flow of hydraulic fluid to the at least one hitch cylinder along the first flow path;
a second flow path fluidly coupled to the first flow path at a first location between the at least one hitch cylinder and the hitch valve, wherein the second flow path is fluidly coupled to a reservoir for the hydraulic fluid; and
a first check valve disposed along the second flow path between the first flow path and the reservoir, wherein the first check valve is configured to keep air from entering the hydraulic system via the second flow path from the reservoir.

2. The hydraulic system of claim 1, wherein the first check valve is configured to keep the air from entering the hydraulic system when the hitch valve is in a first configuration to position the three-point hitch in a neutral position.

3. The hydraulic system of claim 2, wherein the first check valve is configured to keep the air from entering the hydraulic system when the hitch valve is in a second configuration to position the three-point hitch in a float position.

4. The hydraulic system of claim 1, wherein the first check valve is located above a hydraulic fluid level within reservoir.

5. The hydraulic system of claim 1, further comprising a third flow path fluidly coupled to both a piston side of the at least one hitch cylinder and the reservoir, and a second check valve disposed along the third flow path between the at least one hitch cylinder and the reservoir, wherein the second check valve is configured to enable only hydraulic fluid from entering the hydraulic system via the third flow path from the reservoir.

6. The hydraulic system of claim 5, wherein the at least one hitch cylinder comprises a first hitch cylinder, wherein the hydraulic system further comprises a second hitch cylinder fluidly coupled to the hitch valve via the first flow path, wherein the hitch valve is configured to control the flow of hydraulic fluid to the at least one hitch cylinder along the first flow path, wherein the hydraulic system further comprises a fourth flow path fluidly coupled to both a piston side of the second hitch cylinder and the reservoir, and a third check valve disposed along the fourth flow path between the second hitch cylinder and the reservoir, wherein the third check valve is configured to enable only hydraulic fluid from entering the hydraulic system via the fourth flow path from the reservoir.

7. The hydraulic system of claim 6, wherein both the second check valve and the third check valve is located below a hydraulic fluid level within the reservoir.

8. The hydraulic system of claim 6, wherein the third flow path is fluidly coupled to the first flow path at a second location between the first hitch cylinder and the first location, and the fourth flow path is fluidly coupled to the first flow path at a third location between the second hitch cylinder and the first location.

9. The hydraulic system of claim 6, wherein both the second check valve and the third check valve are configured to enable only hydraulic fluid from entering the hydraulic system when the hitch valve is in a first configuration to position the three-point hitch in a neutral position.

10. The hydraulic system of claim 9, wherein both the second check valve and the third check valve are configured to enable only hydraulic fluid from entering the hydraulic system when the hitch valve is in a second configuration to position the three-point hitch in a float position.

11. A three-point hitch, comprising:
a first hitch cylinder;
a second hitch cylinder;
a hydraulic system coupled to both the first hitch cylinder and the second hitch cylinder and configured to provide hydraulic fluid to both the first hitch cylinder and the second hitch cylinder, wherein hydraulic system is configured to keep air from entering the hydraulic system from a reservoir of the hydraulic fluid when the three-point hitch is in a neutral position and when the three-point hitch is in a float position;
a first flow path;
a hitch valve fluidly coupled to both the first hitch cylinder and the second hitch cylinder via the first flow path, wherein the hitch valve is configured to control a flow of hydraulic fluid to both the first hitch cylinder and the second hitch cylinder along the first flow path;
a second flow path fluidly coupled to the first flow path at a first location between the hitch valve and both the first hitch cylinder and the second hitch cylinder, wherein the second flow path is fluidly coupled to the reservoir; and
a first check valve disposed along the second flow path between the first flow path and the reservoir, wherein the first check valve is configured to keep air from entering the hydraulic system via the second flow path from the reservoir.

12. The three-point hitch of claim 11, wherein the first check valve is located above a hydraulic fluid level within the reservoir.

13. The three-point hitch of claim 11, wherein the hydraulic system further comprises a third flow path fluidly coupled to both a piston side of the first hitch cylinder and the reservoir, and a second check valve disposed along the third flow path between the first hitch cylinder and the reservoir, wherein the second check valve is configured to enable only hydraulic fluid from entering the hydraulic system via the third flow path from the reservoir.

14. The three-point hitch of claim 13, wherein the hydraulic system further comprises a fourth flow path fluidly coupled to both a piston side of the second hitch cylinder and the reservoir, and a third check valve disposed along the fourth flow path between the second hitch cylinder and the reservoir, wherein the third check valve is configured to enable only hydraulic fluid from entering the hydraulic system via the fourth flow path from the reservoir.

15. The three-point hitch of claim 14, wherein both the second check valve and the third check valve is located below a hydraulic fluid level within the reservoir.

16. The three-point hitch of claim 14, wherein the third flow path is fluidly coupled to the first flow path at a second location between the first hitch cylinder and the first location, and the fourth flow path is fluidly coupled to the first flow path at a third location between the second hitch cylinder and the first location.

17. A method for operating a hydraulic system of a three-point hitch, comprising:
controlling a flow of hydraulic fluid to both a first hitch cylinder and a second hitch cylinder of the three-point hitch via a hitch valve fluidly coupled to both the first hitch cylinder and the second hitch cylinder via a first flow path;

keeping air from entering the hydraulic system from a reservoir of the hydraulic fluid when the three-point hitch is in a neutral position and when the three-point hitch is in a float position; and keeping the air from entering the hydraulic system from the reservoir from a second flow path via a first check valve disposed along the second flow path, wherein the second flow path is fluidly coupled to both the first flow path and reservoir, and the first check valve is located above a hydraulic fluid level within the reservoir.

18. The method of claim 17, further comprising enabling only hydraulic fluid from entering the hydraulic system from the reservoir from both a third flow path and a fourth flow path via a second check and a third check valve respectively disposed along the third flow path and the fourth flow path, wherein the third flow path is fluidly coupled to both the first hitch cylinder and the reservoir, the fourth flow path is fluidly coupled to both the second hitch cylinder and the reservoir, and both the second check valve and the third check valve are located below the hydraulic fluid level within the reservoir.

* * * * *